US009264613B2

(12) United States Patent
Choi

(10) Patent No.: US 9,264,613 B2
(45) Date of Patent: Feb. 16, 2016

(54) APPARATUS AND METHOD FOR CONTROLLING CURRENT CONSUMPTION OF MOBILE TERMINAL

(71) Applicant: Samsung Electronics Co., Ltd., Gyeonggi-do (KR)

(72) Inventor: Chi-Jeong Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 62 days.

(21) Appl. No.: 14/092,097

(22) Filed: Nov. 27, 2013

(65) Prior Publication Data

US 2014/0148227 A1    May 29, 2014

(30) Foreign Application Priority Data

Nov. 28, 2012 (KR) .................. 10-2012-0136593

(51) Int. Cl.
*H04N 5/232* (2006.01)
*H04W 52/02* (2009.01)

(52) U.S. Cl.
CPC ....... *H04N 5/23241* (2013.01); *H04W 52/0251* (2013.01)

(58) Field of Classification Search
CPC .............................. H04N 5/23241
USPC .......................................... 348/372
See application file for complete search history.

(56) References Cited

U.S. PATENT DOCUMENTS

| 7,113,216 | B2 * | 9/2006 | Yoshida .................. 348/333.13 |
| 8,194,180 | B2 * | 6/2012 | Shibuno et al. ............. 348/372 |
| 2003/0071913 | A1 * | 4/2003 | Yoshida ..................... 348/372 |
| 2011/0032375 | A1 * | 2/2011 | Kawano et al. ........... 348/222.1 |
| 2012/0254907 | A1 | 10/2012 | Serdiuk | |

* cited by examiner

*Primary Examiner* — James Hannett
(74) *Attorney, Agent, or Firm* — The Farrell Law Firm, P.C.

(57) ABSTRACT

Disclosed is an apparatus and method for controlling current consumption of a mobile device. The method includes measuring weather in an environment of the mobile device and comparing the measured value with an operating threshold. When the measured value is out of the operating range, current consumed by the mobile device is controlled.

18 Claims, 3 Drawing Sheets

APPARATUS AND METHOD FOR CONTROLLING CURRENT CONSUMPTION OF MOBILE TERMINAL

PRIORITY

This application claims priority under 35 U.S.C. §119(a) to Korean Application Serial No. 10-2012-0136593, filed in the Korean Intellectual Property Office on Nov. 28, 2012, the entire content of which is incorporated herein by reference.

BACKGROUND OF THE INVENTION

1. Field of the Invention

The present invention generally relates to a mobile terminal, and more particularly, to an apparatus and method for controlling current consumption of a mobile terminal.

2. Description of the Related Art

In general, a smart phone refers to a terminal that combines advantages of a mobile communication terminal, i.e., a personal communication services terminal, and a Personal Digital Assistant (PDA) terminal, and incorporates data communication functions, such as schedule management, still image photographing, moving image photographing, facsimile transmission/reception, and Internet access, with the mobile communication terminal functions, such as voice call-related functions.

In addition, a terminal with a camera module that includes mobile communication capability, e.g., a Samsung Galaxy Camera, that mainly serves to photograph images, but also includes mobile communication capability as a main function is referred to as a mobile terminal, with the mobile communication module having a built-in camera also is referred to as a mobile terminal.

As the performance of such a mobile terminal improves, applications adapted to the mobile terminal's operating system rapidly increase, and the functions of the mobile terminal increase. Due to these various applications and functions, the amount of current consumed by a mobile terminal is on an increasing trend, and technologies for reducing this current consumption have been developed.

In a conventional mobile terminal, however, a greater voltage drop occurs at low temperature than at room temperature when current consumption is rapidly increased. Therefore, a problem arises in that, despite a battery of a mobile terminal being sufficiently charged, the battery cannot normally provide the mobile terminal with sufficient current, and thus the mobile terminal can power off or malfunction. In particular, a mobile terminal with a camera module having a lens barrel unit will frequently cause such problems because current consumption rapidly increases as the lens barrel unit moves, in particular at the initialization of the camera module.

SUMMARY OF THE INVENTION

Aspects of embodiments of the present invention are to at least partially solve, alleviate, or remove at least one of the problems and/or disadvantages related to the prior art.

To solve the above problems occurring in conventional devices, an aspect of the present invention provides an apparatus and method for controlling current consumption of a mobile terminal.

Further, to solve the above problems of conventional devices, another aspect of the present invention provides an apparatus and method for controlling current consumption of a mobile terminal, which eliminates inconvenience in using the mobile terminal by controlling current supplied to constituent elements that have large current consumption upon an instantaneous voltage drop of the mobile terminal.

In accordance with an aspect of the present invention, a method of controlling current consumption of a mobile terminal is provided that includes measuring weather in an environment of the mobile terminal and controlling current consumed by the mobile terminal, based on a result of the measuring.

In accordance with another aspect of the present invention, a method of controlling current consumption of a mobile terminal is provided. The method includes measuring weather in an environment of the mobile terminal upon one of a boot-up operation of the mobile terminal and activation of a photographing operation of the mobile terminal; and reducing current consumed by the mobile terminal by restricting a specific module of the mobile terminal from operating, based on a result of the measuring.

In accordance with yet another aspect of the present invention, an apparatus for controlling current consumption of a mobile terminal is provided. The apparatus includes a sensor that measures weather in an environment of the mobile terminal upon one of a boot-up operation of the mobile terminal and activation of a photographing operation of the mobile terminal; and a controller that reduces current consumed by the mobile terminal by restricting a specific module of the mobile terminal from operating, based on the weather measured by the sensor.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
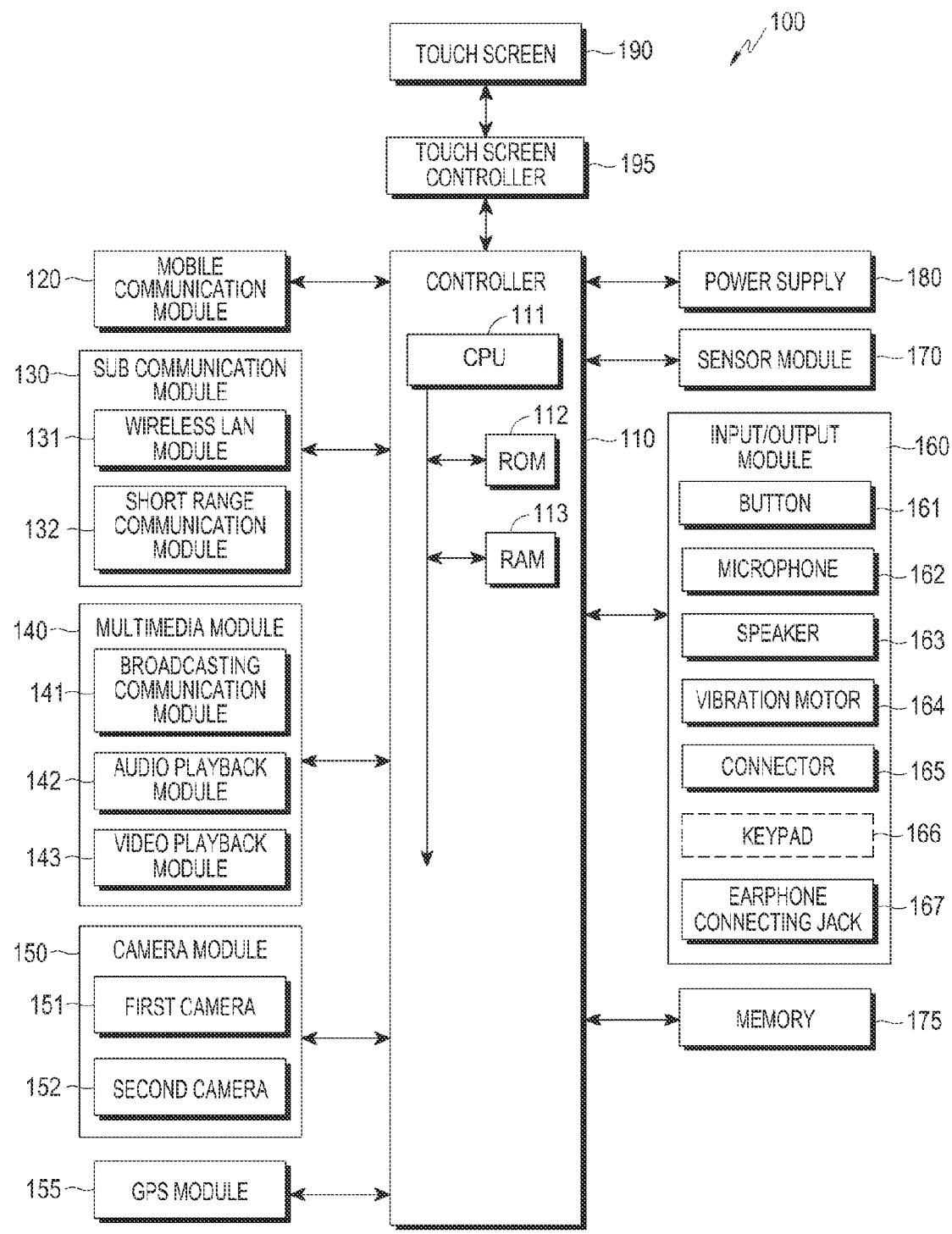
FIG. 1 is a block diagram schematically illustrating a mobile terminal according to an embodiment of the present invention.

The present invention will now be described more fully with reference to the accompanying drawings in which some particular embodiments are shown, but the present invention may have various embodiments and changes may be made therein. Therefore, it should be understood that there is no intent to limit the present invention to the particular embodiments disclosed, but the present invention should be construed to cover all modifications, equivalents, and alternatives falling within the spirit and scope of the invention.

While terms including ordinal numbers, such as "first" and "second," etc., may be used to describe various components, such components are not limited by the above terms. The above terms are used merely for the purpose of distinguishing an element from another. For example, a first element may be termed a second element, and likewise a second element may be termed a first element without departing from the scope of the present invention. As used herein, the term "and/or" encompasses any one or combination of plural relevant items.

The terms used herein are merely for the purpose of describing particular embodiments and are not intended to limit the present invention. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical terms and scientific terms, have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an operational principle for embodiments of the present invention will be described in detail with reference to the accompanying drawings. In the following description of the present invention, a detailed description of known functions and configurations incorporated herein will be omitted when it may make the subject matter of the present invention unclear. The terms which will be described below are terms defined in consideration of the functions in the present invention, and may be different according to users, intentions of the users, or customs. Therefore, their definition will be made based on the overall contents of this specification.

FIG. 1 is a block diagram illustrating a mobile terminal according to an embodiment of the present invention.

First, it should be noted that the present invention may be applied to not only a camera module that is built-in to a mobile phone or smart phone, but also a mobile communication module that is built-in to a portable camera, e.g., Samsung Galaxy Camera.

As shown in FIG. 1, a mobile terminal 100 may be connected to an external device (not shown) by using an external device connection unit, such as a sub communication module 130, a connector 165, and an earphone connecting jack 167. The external device may include various devices attached to or detached from the mobile terminal 100 and connected thereto by a cable, such as an earphone, an external speaker, a Universal Serial Bus (USB) memory, a charger, a cradle/dock, a mobile payment-related device, a health management device (blood glucose meter, etc.), a gaming machine, a car navigation device, and the like. Further, the external device may include one of a short range communication device, such as a Bluetooth communication device, a Near Field Communication (NFC) device, or a WiFi Direct communication device, which can be wirelessly connected to the mobile terminal 100 through short range communication, and a wireless Access Point (AP). Further, the external device may include one of another mobile terminal, a mobile phone, a smart phone, a tablet PC, a desktop PC, and a server.

The mobile terminal 100 may be a smart phone, a camera, a camera with a built-in communication module for providing voice communication, video communication, and data communication to the camera, a mobile phone, a gaming machine, a TV, a display device, a vehicle head unit, a notebook PC, a laptop PC, a tablet PC, a Personal Media Player (PMP), a Personal Digital Assistant PDA), or the like. Further, the mobile terminal 100 may be implemented as a portable camera with a wireless communication function.

Referring to FIG. 1, the mobile terminal 100 includes a touch screen 190 and a touch screen controller 195. Further, the mobile terminal 100 includes a controller 110, a mobile communication module 120, a sub communication module 130, a multimedia module 140, a camera module 150, a Global Positioning System (GPS) module 155, an input/output module 160, a sensor module 170, a memory 175, and a power supply 180. The sub communication module 130 includes at least one of a wireless LAN module 131 and a short range communication module 132, and the multimedia module 140 includes at least one of a broadcasting communication module 141, an audio playback module 142, and a video playback module 143. The camera module 150 includes at least one of a first camera 151 and a second camera 152, and the input/output module 160 includes at least one of a button 161, a microphone 162, a speaker 163, a vibration motor 164, a connector 165, a keypad 166, and an earphone connecting jack 167.

The controller 110 includes a Central Processing Unit (CPU) 111, a Read Only Memory (ROM) 112 storing a control program for controlling the mobile terminal 100, and a Random Access Memory (RAM) 113 storing a signal or data input from outside of the mobile terminal 100 or used as a memory area for tasks performed in the mobile terminal 100. The CPU 111 may include a single core, a dual core, a triple core, or a quad core. The CPU 111, the ROM 112, and the RAM 113 may be connected to each other through an internal bus.

The controller 110 may control the mobile communication module 120, the sub communication module 130, the multimedia module 140, the camera module 150, the GPS module 155, the input/output module 160, the sensor module 170, the memory 175, the power supply 180, the touch screen 190, and the touch screen controller 195.

The mobile communication module 120, the sub communication module 130, and the broadcasting communication module 141 of the multimedia module 140 may be collectively called a communication unit, and the communication unit is provided for a direct connection to an external device or a connection to an external device through a network and may be a wired or wireless communication unit. The communication unit may transmit data output from the controller 110, the memory 175, and the camera module 150, by a cable or wirelessly, or receive data by hard wired external communication, i.e., by a cable, or wirelessly, and transmit the received data to the controller 110 or store the received data in the memory 175.

Under the control of the controller 110, the mobile communication module 120 may allow the mobile terminal 100 to be connected to an external device through mobile communication by using at least one antenna (not shown). The mobile communication module 120 may transmit/receive a wireless signal for exchange, unidirectional transmission, or unidirectional reception of data, such as a voice call, a video call, a Short Message Service (SMS) message, or a Multimedia Message Service (MMS) message, to/from a mobile phone, a smart phone, a tablet PC, or another device having a phone number input into the mobile terminal 100 or a network address.

The sub communication module 130 may include at least one of the wireless LAN module 131 and the short range communication module 132. As an example, the sub communication module 130 may include only the wireless LAN module 131, only the short range communication module 132, or both the wireless LAN module 131 and the short range communication module 132.

Under the control of the controller 110, the wireless LAN module 131 may be connected to the Internet in a place where a wireless AP is installed. The wireless LAN module 131 may support the wireless LAN standard, e.g., IEEE 802.11x of the Institute of Electrical and Electronic Engineers. Under the control of the controller 110, the short range communication module 132 may perform short range wireless communication between the mobile terminal 100 and an image forming device. The short range wireless communication may include Bluetooth™, Infrared Data Association (IrDA), WiFi-Direct communication, Near Field Communication (NFC), and the like.

The mobile terminal 100 may include at least one of the mobile communication module 120, the wireless LAN module 131, and the short range communication module 132, depending on its capability. As an example, the mobile terminal 100 may include a combination of the mobile communication module 120, the wireless LAN module 131, and the short range communication module 132, depending on its capability.

The multimedia module 140 may include the broadcasting communication module 141, the audio playback module 142, or the video playback module 143. Under the control of the controller 110, the broadcasting communication module 141 may receive a broadcasting signal, e.g., a TV broadcasting signal, a radio broadcasting signal, or a data broadcasting signal, and broadcasting supplement information, e.g., Electric Program Guide (EPG) or Electric Service Guide (ESG), transmitted from a broadcasting station, through a broadcasting communication antenna. Under the control of the controller 110, the audio playback module 142 may play back a stored or received digital audio file, e.g., a file having a file extension of mp3, wma, ogg, or way. Under the control of the controller 110, the video playback module 143 may play back a stored or received digital video file, e.g., a file having a file extension of mpeg, mpg, mp4, avi, mov, or mkv, through the touch screen 190.

The multimedia module 140 may include only the audio playback module 142 and the video playback module 143, excluding the broadcasting communication module 141. Further, the audio playback module 142 and/or the video playback module 143 of the multimedia module 140 may be included in the controller 110.

The camera module 150 may include at least one of the first camera 151 and the second camera 152 for photographing a still image or a moving image under the control of the controller 110. Further, the camera module 150 may include a lens barrel unit (FIGS. 2-3) that provides a zoom function, and the first camera 151 or the second camera 152 may include an auxiliary light source, e.g., a flash, that provides light required for photographing. The first camera 151 may be disposed on the front surface of the mobile terminal 100, and the second camera 152 may be disposed on the back surface of the mobile terminal 100. Alternatively, the first camera 151 and the second camera 152 may be disposed adjacent to each other, preferably with an interval between the first camera 151 and the second camera 152 being greater than 1 cm and smaller than 8 cm, to photograph a three-dimensional still or moving image. Such a camera module including a barrel-type lens is described in detail with reference to FIGS. 2-3. Each of the first and second cameras 151 and 152 of the camera module 150 may include a lens system, an image sensor, a flash, and the like. Each of the first and second cameras 151 and 152 may convert an optical signal input, i.e., photographed, through the lens system into an image signal and output the converted image signal to the controller 110, and a user may photograph a still or moving image through the first and second cameras 151 and 152.

The lens system allows external incident light to converge on the focus and thereby form an image of a subject. The lens system may include at least one lens, and each lens may be a convex lens, an aspheric lens, or the like. The lens system is symmetric with respect to an optical axis that passes the center of the lens system and thus is defined as the central axis. The image sensor detects an optical image, formed by external light incident through the lens system, as an electrical image signal. The image sensor may include a plurality of pixel units arranged in an M×N matrix structure, and each of the pixel units may include a photodiode and a plurality of transistors. The pixel units accumulate electric charges generated by the incident light, and the voltage induced by the accumulated electric charges represents the intensity of the incident light. In processing one image that constitutes a still or moving image, an image signal output from the image sensor may consist of a set of voltages, i.e., pixel values, output from the pixel units, and the image signal represents one frame, i.e., a still image, that may include M×N pixels. As the image sensor, for example, a Charge-Coupled Device (CCD) image sensor, a Complementary Metal-Oxide Semiconductor (CMOS) image sensor, or the like may be used.

A drive unit may drive the image sensor under the control of the control unit 110. The drive unit may operate all the pixels or only the pixels located in a region of interest among the pixels of the image sensor, depending on a control signal received from the controller 110, and image data output from the pixels is output to the controller 110.

The controller 110 processes an image input from each of the first and second cameras 151 and 152 or stored in the memory 175 in units of frames and outputs an image frame, which is converted to be suitable for screen characteristics (size, picture quality, resolution, etc.) of the touch screen 190, to the touch screen 190. Further, the controller 110 may detect movements of the mobile terminal 100 created by a user's movements and movements of a transportation means, such as when the user rides on the transportation means, including a bus, subway, taxi, or the like, by using the location of the mobile terminal or the transportation means and the velocities of the movements.

The GPS module 155 may receive radio waves from a plurality of GPS satellites to calculate a location of the mobile terminal 100, i.e., a location of a user carrying the mobile terminal, by using the Time Of Arrival (TOA) from each of the GPS satellites to the mobile terminal 100. Although only the GPS module is shown and described in the specification, this is merely one example, and the mobile terminal 100 may include a WiFi Positioning System (WPS) together with the GPS module 155 or may include at least one of the GPS module and the WPS module.

The input/output module 160 may include at least one of the button 161, the microphone 162, the speaker 163, the vibration motor 164, the connector 165, the keypad 166, and the earphone connecting jack 167. Except for the connector 165, the input/output module 160 is used to receive a user input or inform a user of any information, and as other examples of the input/output module 160, a mouse, a trackball, a joystick, or a cursor control such as cursor direction keys may be provided to perform information communication with the controller 110 and control movements of the cursor on the touch screen 190, but the present is not limited thereto.

The button 161 may be formed on the front surface, side surface, or back surface of the mobile terminal 100, and may include at least one of a power/lock button, a volume button including a volume up button and a volume down button, a menu button, a home button, a back button, and a search button.

Under the control of the controller 110, the microphone 162 may receive a voice or sound from a user or the ambient environment and generate the received voice or sound into an electrical signal.

Under the control of the controller 110, the speaker 163 may output sounds corresponding to various signals, e.g., a wireless signal, a broadcasting signal, a digital audio file, a digital video file, image photographing, etc., from the mobile communication module 120, the sub communication module 130, the multimedia module 140, or the camera module 150 to the outside of the mobile terminal 100. The speaker 163 may output a sound, e.g., a button operation tone or ring back tone corresponding to a phone call, corresponding to a function performed by the mobile terminal 100. One or more speakers 163 may be formed in an appropriate position or appropriate positions of the mobile terminal 100.

Under the control of the controller 110, the vibration motor 164 may convert an electrical signal to a mechanical vibration. As an example, when the mobile terminal 100 that is in a vibration mode receives a voice or video call from an external device, the vibration motor 164 is operated. One or more vibration motors may be formed within the mobile apparatus 100. The vibration motor may be operated in response to a touch action of a user on the touch screen 190 or a continuous touch movement on the touch screen 190.

The connector 165 may be used as an interface for connecting the mobile terminal 100 to an external device or a power source. Under the control of the controller 110, the mobile terminal 100 may transmit data stored in the memory 175 of the mobile terminal 100 to the external device or receive data from the external device through a wired cable connected to the connector 165. Also, the mobile terminal 100 may receive power from an external power source or charge a battery using the power source through a wired cable connected to the connector 165.

The keypad 166 may receive a key input for the control of the mobile terminal 100 from a user. The keypad 166 may include a physical keypad formed in the mobile terminal 100 or a virtual keypad displayed on the touch screen 190. The physical keypad formed in the mobile terminal 100 may be omitted according to the capability or structure of the mobile terminal 100.

An earphone may be inserted into the earphone connecting jack 167 to be connected to mobile terminal 100.

The sensor module 170 may include at least one sensor for detecting a state, i.e., position, direction, motion, etc., of the mobile terminal 100. Further, the sensor module 170 may include a sensor for sensing ambient temperature, humidity, color, or the like in an environment of mobile terminal 100. As an example, the sensor module 170 may include a proximity sensor for detecting whether a user approaches the mobile terminal 100, a light sensor for detecting the amount of ambient light of the mobile terminal 100, a motion/direction sensor for detecting motion, e.g., rotation, acceleration, deceleration, or vibration, of the mobile terminal 100, an altimeter for measuring altitude, a manometer for measuring atmospheric pressure, a thermometer for measuring atmospheric temperature, and a hygrometer for measuring atmospheric humidity.

Further, the motion/direction sensor may include an acceleration sensor, a geo-magnetic sensor for detecting the point of the compass of the mobile terminal 100 by using the Earth's magnetic field, a gravity sensor for detecting the direction of gravity action, a gyro sensor, an impact sensor, a compass sensor, and the like. The sensor module 170 may detect a state of the mobile terminal 100, generate a signal corresponding to the detection, and transmit the generated signal to the controller 110. The sensors of the sensor module 170 may be added or omitted depending on the capability of the mobile terminal 100.

Under the control of the controller 110, the memory 175 may store a signal or data input/output into/from the mobile communication module 120, the sub communication module 130, the multimedia module 140, the camera module 150, the GPS module 155, the input/output module 160, the sensor module 170, or the touch screen 190. The memory 175 may store control programs and applications for controlling the mobile terminal 100 or the controller 110.

The term "memory" encompasses any type of data storage device such as the memory 175, the ROM 112 and the RAM 113 within the controller 110, and a memory card, e.g., an SD card or a memory stick, mounted in the mobile terminal 100.

Further, the memory 175 may store images for providing applications having various functions, such as navigation, video communication, gaming, and time-based alarming for a user, and Graphical User Interfaces (GUIs) related thereto, databases or data related to processing of user information, documents, and touch inputs, background images e.g., menu screens, standby screens, etc., to drive the mobile terminal 100, operating programs, images photographed by the camera module 150, and the like. The memory 175 is a machine (e.g., computer)-readable medium, and the term "machine-readable medium" may be defined as a non-transitory medium for providing data to a machine so as for the machine to perform a specific function. The machine-readable medium may be a storage medium. The memory 175 may include a non-volatile medium and a volatile medium. All such media should be of a type in which commands transferred by the media can be detected by a physical mechanism that reads the commands into a machine.

The machine-readable media include, but not limited to, at least one of a floppy disc, a flexible disc, a hard disc, a magnetic tape, a Compact Disc ROM (CD-ROM), an optical disc, a punch card, a paper tape, a RAM, a Programmable ROM (PROM), an Erasable PROM (EPROM), and a Flash EPROM (FEPROM).

The respective modules of the mobile terminal according to the present invention have the above-mentioned functions, and a detailed description will be given below of an apparatus and method for allowing the respective modules of the mobile terminal to be normally operated by detecting temperature in the mobile terminal and controlling the current consumed by the respective modules of the mobile terminal, depending on the detected temperature.

Figure 2:
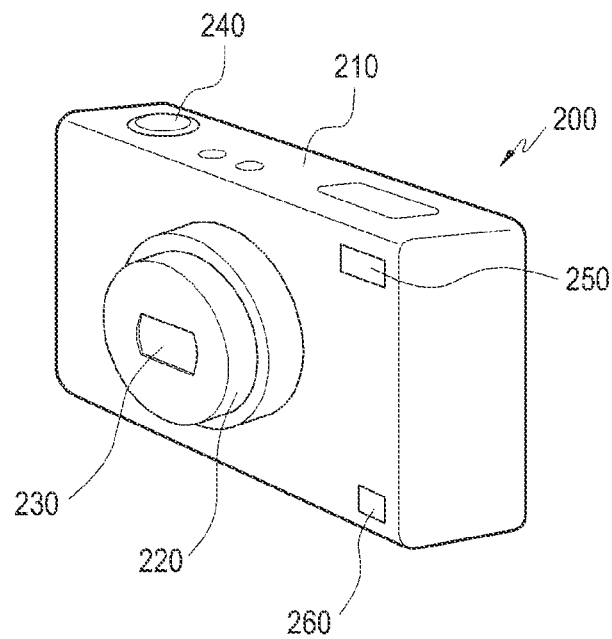
FIG. 2 is an external perspective view of the mobile terminal showing a built-in camera according to an embodiment of the present invention.

FIG. 2 is an external perspective view of the mobile terminal showing a built-in camera according to an embodiment of the present invention.

As shown in FIG. 2, a built-in camera 200 is provided that includes a camera main body 210, a lens barrel unit 220 that adjusts a zoom level so as to take a close up or take a long shot of a subject and also serves as the lens barrel of the camera 200, an optical element 230 that is a lens for imaging a subject and is provided in the lens barrel unit 220, a shutter control 240, a flash 250, and a sensor unit 260 that senses ambient temperature, humidity, and pressure, including atmospheric pressure.

The sensor unit 260 may be formed on one side of the outside of the mobile terminal or inside of the mobile terminal.

Figure 3:
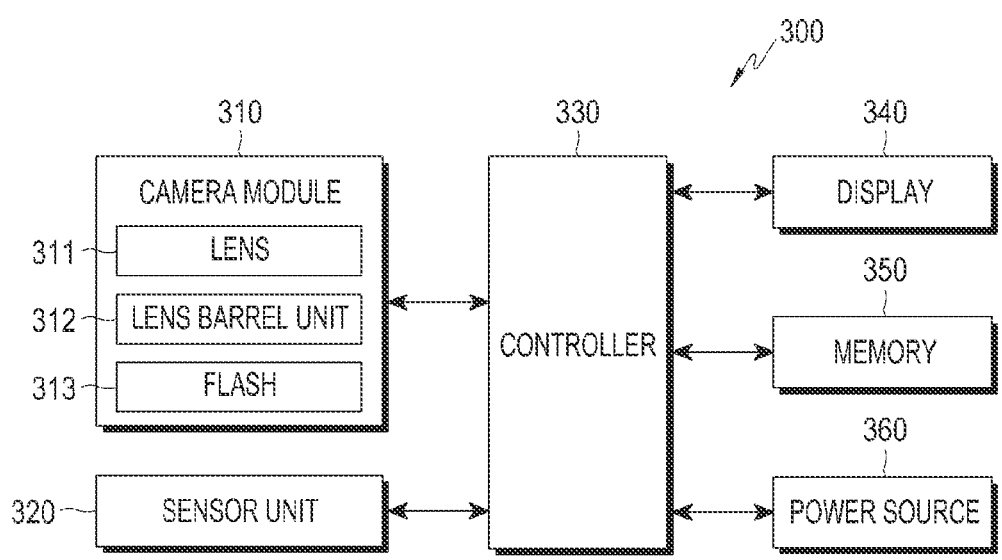
FIG. 3 is a block diagram illustrating an apparatus for controlling current consumption in a mobile terminal according to an embodiment of the present invention.

FIG. 3 is a block diagram illustrating an apparatus for controlling current consumption in a mobile terminal according to an embodiment of the present invention.

As shown in FIG. 3, the apparatus includes a sensor unit 320 to measure temperature and the like to control current consumption in a mobile terminal that includes a built-in camera that includes a camera module 310 including a lens 311 for photographing a subject, a lens barrel unit 312 for adjusting zoom of the lens, and a flash 313 for providing a light source for photographing. The sensor unit 320 is provided for measuring weather including ambient temperature, humidity, and pressure, including atmospheric pressure. Display 340 is provided for displaying a to-be-photographed subject in order to photograph the subject, displaying a photographed subject, and displaying various applications and the measured temperature, humidity, and pressure. Memory 350 stores a photographed image of a subject and the measured temperature, humidity, and pressure values. Controller 330 controls the operation of the mobile terminal and camera, and controls the current consumed by respective elements and a clock rate by using values sensed by the sensor unit 320. Power source, e.g., battery, 360 supplies power to operate functions and applications of the mobile terminal.

Although FIG. 3 schematically illustrates the apparatus as including sensor unit 320 for measuring temperature and other external parameters to control current consumption in a mobile communication function built-in camera, it is apparent that the apparatus is briefly illustrated merely for the convenience of description and the respective blocks of FIG. 3 may perform functions that are performed in the corresponding blocks shown in FIG. 1. In addition, it is also apparent that the apparatus for controlling current consumption according to the present invention may be applied to a camera that is built-in to a mobile terminal, as well as a mobile communication terminal having a built-in camera.

As an example, the memory 350 may store images for providing applications having various functions, such as navigation, a video phone call, and gaming, and GUIs related thereto, databases or data related to a method of processing user information, documents, and touch inputs, background images or operating programs required to drive the mobile terminal, and the like. Further, the memory 350 stores data regarding weather measured by the sensor unit 320.

The camera module 310 includes at least one camera that photographs a still or moving image under the control of the controller 330, a lens 311, a lens barrel unit 312 that zooms in/out the lens for photographing, a flash 313 that provides light required to photograph an image, and a motor that operates the lens barrel unit.

The sensor unit 320 measures weather including at least one of the temperature, humidity, and pressure, including atmospheric pressure of in an environment, i.e., a place or location, where the mobile terminal is located and transmits the measured value to the controller 330. Further, the sensor unit 320 measures weather in an environment of, i.e., around, the mobile terminal when the mobile terminal is booted up and/or when the photographing operation provided in the mobile terminal is activated.

The controller 330 may include more than one core, with a dual core referring to a controller including two cores, and a quad core refers to a controller including four cores. In this way, the controller 330 may include a plurality of cores. Further, when it is determined that the ambient temperature measured by the sensor unit 320 is outside of a threshold range, the controller 330 determines that an instantaneous voltage drop may occur in the power source 360, and may reduce current consumption according to the present invention. Further, the controller 330 may not only control the lens barrel unit 312 provided in the camera module 310, but may also control the current consumed by the lens barrel unit 312. Furthermore, the controller 330 controls the current consumed by the respective modules of the mobile terminal, e.g., by adjusting the brightness of the display, and compares a measured value from the sensor unit 320 with a predetermined threshold value or determines whether a measured value is within or out of an operating range. In addition, when a measured value is less than the predetermined threshold value or is not within the operating range, the controller 330 reduces current consumption by restricting the clock rate of the cores or switching a certain number of cores to a deactivation mode for a predetermined period of time. The predetermined period of time is variable and may be set by the manufacturer of the mobile terminal. As described above, when weather measured by the sensor unit 320 is out of the threshold range, the controller 330 reduces the current consumed by the mobile terminal by restricting the clock rate to a predetermined clock rate or switching at least one of a plurality of cores to the deactivation mode before and/or during initialization of the mobile terminal.

In this way, the controller 330 reduces the clock rate or switches at least one core to the deactivation mode, thereby controlling current consumption such that the maximum value of instantaneous current consumption does not exceed the maximum current available from the power source 360. That is, the controller 330 reduces the current consumed by an element, i.e., a constituent element, that has a highest instantaneous current consumption among the elements included in the mobile terminal. Otherwise, the controller 330 reduces the current consumed by the controller itself by reducing its clock rate and the number of operating cores or switching at least one or more of a plurality of cores included therein to the deactivation mode for a predetermined period of time. As an example, the controller 330 reduces current consumption by reducing its clock rate from 1.5 GHz to 0.5 GHz or reducing the number of operating cores among cores included therein. In this way, since the value of current consumption is temporarily lowered by temporarily reducing the clock rate and the number of operating cores that contribute to high instantaneous current consumption or temporarily switching a certain number of cores to the deactivation mode, the reduced clock rate will be normally recovered as the deactivated cores are switched to an activation mode after a predetermined period of time, and booting up the mobile terminal or activating the photographing operation through the mobile terminal is not impeded. The operating range is a range required to boot up the mobile terminal and activate the photographing operation, and the operating range is differently set depending on the temperature, humidity, and pressure.

Subsequently, if the current consumed by the mobile terminal is reduced, then the controller 330 initializes the mobile terminal by activating at least one of the boot-up operation and the photographing operation of the mobile terminal. That is, the mobile terminal stops a series of steps of controlling current consumption and boots up the mobile terminal or activates the photographing operation. This initialization further includes completion of hand-shake correction block initialization and then zoom lens initialization. The zoom lens initialization refers to a step of performing zoom in/out. Further, the shutter is opened, the iris diaphragm is opened, and then the auto focus function is performed. Each of these steps is referred to as the initialization process.

Figure 4:
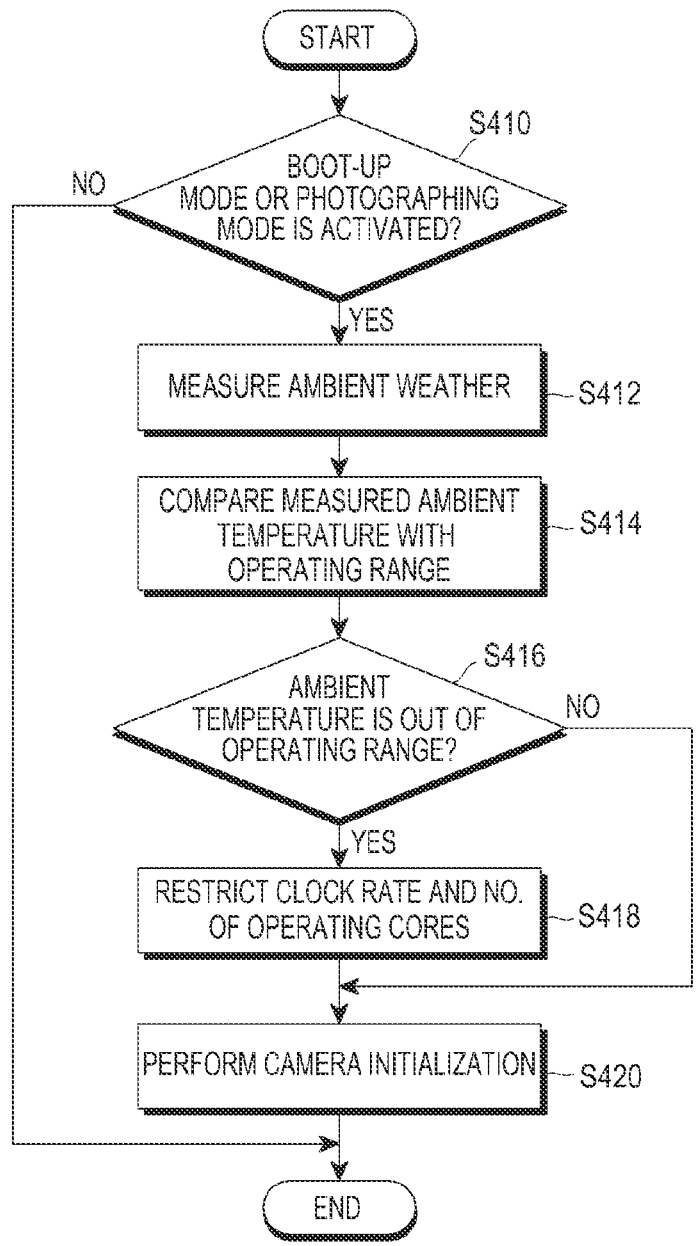
FIG. 4 is a flowchart illustrating a method of measuring temperature to control current consumption in a mobile terminal according to an embodiment of the present invention.

FIG. 4 is a flowchart illustrating a method of measuring temperature to control current consumption in a mobile terminal according to an embodiment of the present invention.

Hereinafter, the method of measuring temperature, particularly temperature in an environment of the mobile terminal, to control current consumption in a mobile terminal according to an embodiment of the present invention will be described in detail with reference to FIG. 4.

If the mobile terminal is booted up or the photographing operation of the mobile terminal is activated through the camera module of the mobile terminal, then weather including at least one of the temperature, humidity, and pressure, including atmospheric pressure of an environment where the mobile terminal is located is measured in steps S410 and S412. This temperature, humidity, and pressure, including atmospheric pressure, are measured by the sensor unit 320.

Upon completion of the temperature measurement, the measured temperature is compared with the operating range in step S414. The operating range is a range of appropriate values for driving the mobile terminal. That is, a camera module provided in a mobile terminal or a camera equipped with a mobile communication module may not be operated because it is not normally supplied with power from the power source 360 at or below/above an appropriate temperature. As an example, a conventional camera module may not be normally supplied with power because the voltage of the power source is rapidly lowered at or below an outside temperature of 0° C. The present invention is intended to normally activate the camera module to photograph a subject even at or below an outside temperature of 0° C.

When the measured temperature is determined to be out of the operating range in step S416, the clock rate and the number of operating cores of the mobile terminal are temporarily restricted for a predetermined period of time in step S418. The clock rate operates the constituent elements included in the mobile terminal, and information may be transmitted/received at the clock rate. Further, for a mobile terminal having a plurality of cores, with each core consuming current while being operated, when the measured weather is out of the operating range, the controller reduces the current consumed by switching at least one core to the deactivation mode for a predetermined period of time. For a quad-core CPU that consumes 400 mA in a fully activated mode, current consumption can be reduced to 100 mA by deactivating three of the four cores. The lowered clock rate is restored to the original clock rate and the deactivated cores are reactivated after the predetermined period of time.

Further, when the mobile terminal is booted up or the photographing operation is activated, the camera is generally initialized at the maximum clock rate all cores may be activated, which may cause instantaneously consumed current to increase to a maximum value. In the mobile terminal having such a structure, current consumption can be reduced by temporarily restricting the clock rate or reducing the number of operating cores when the measured temperature is less than a threshold value. When the mobile terminal is booted up or the photographing operation is activated, the lens barrel unit 312 performs a zoom operation in which zoom in/out is achieved. In this situation, the sum of the current consumed by the lens barrel unit 312, the current consumed by the quad core, and the current consumed by the other modules of the mobile terminal may instantaneously exceed the current available from the power source 360.

As an example, the current available from the power source 360 is generally 2 A, while a current of about 700 mA is consumed by the zoom in/out operation of the lens barrel unit, a current of about 700 mA is also consumed by the operation of the quad core, and a current of 600 mA or greater is further consumed by the other modules of the mobile terminal. When the total current consumed by the mobile terminal instantaneously exceeds the current available from the power source, the mobile terminal may not boot up, the photographing operation may not be activated, and the mobile terminal may unexpectedly power down.

In order to prevent such abnormal powering down of the mobile terminal caused by instantaneous current consumption exceeding the current available from the power source, the present invention reduces the instantaneous current consumption by measuring temperature around the mobile terminal and restricting the clock rate and the number of operating cores when the measured temperature is less than a threshold value of the operating range.

Subsequently, camera initialization is performed by the boot-up of the mobile terminal or for the photographing of a subject through the activated photographing operation in step S420. That is, once the current is controlled, the mobile terminal is initialized by booting up the mobile terminal and/or activating the photographing operation.

As described above, the present invention provides an apparatus and method for controlling current consumption of a mobile terminal, by which current can be normally supplied to the mobile terminal without a voltage drop even when weather in the environment around the mobile terminal is suddenly changed or the ambient temperature of the mobile terminal is lowered.

It will be appreciated that embodiments of the present invention may be implemented in non-transitory software, hardware, or a combination thereof. Any such software may be stored, for example, in a volatile or non-volatile storage device such as a ROM, a memory such as a RAM, a memory chip, a memory device, or a memory IC, or an optically or magnetically recordable and machine (e.g., computer)-readable storage medium such as a CD, a DVD, a magnetic disk, or a magnetic tape, regardless of its ability to be erased or re-recorded. It will be understood that a memory which may be included in the mobile terminal corresponds to an example of machine-readable storage media suitable to store a program or programs including instructions by which embodiments of the present invention are implemented. Therefore, embodiments of the present invention include a program including codes for implementing an apparatus or method claimed in any one of the accompanying claims and a machine-readable medium for storing such a program. Further, such a program as described above may be electronically transferred through any medium such as a communication signal transmitted through a cable or wireless connection, and the present invention appropriately includes equivalents thereof.

Further, the mobile terminal may receive and store the program from a program providing device connected thereto in a wired or wireless manner. The program providing device may include a memory for storing a program including instructions, which allows the mobile terminal to perform a predetermined content protecting method, and information required for the content protecting method, a communication unit for performing wired or wireless communication with the mobile terminal, and a controller for transmitting the corresponding program to the host device at the request of the mobile terminal or automatically.

Although specific embodiments have been described in the detailed description of the present invention, it will be apparent to those skilled in the art that various changes and modifications may be made without departing from the scope of the present invention. Therefore, the scope of the present invention should not be defined as being limited to the above-described embodiments, but should be defined by the appended claims and equivalents thereof.

What is claimed is:

1. A method for controlling current consumption of a mobile device, the method comprising:
identifying ambient weather of the mobile device in response to receiving a request for at least one of booting of the mobile device and initiating a camera of the mobile device; and
limiting a current consumed by the mobile device while booting of the mobile device or initiating the camera of the mobile device, based on the identified ambient weather,
wherein the limiting of the current consumed by the mobile device is stopped when the booting or the initiating is completed.

2. The method of claim 1, wherein the initiating of the camera of the mobile device includes movement of a lens barrel.

3. The method of claim 1, wherein the limiting of the current consumed by the mobile device comprises restricting operation of at least one module of the mobile device having a high instantaneous current consumption.

4. The method of claim 3, wherein the at least one module is at least one of the camera application and at least one processor of the mobile device.

5. The method of claim 1, wherein the limiting of the current consumed by the mobile device comprises restricting at least one of a clock rate and a number of operating cores of at least one processor of the mobile device.

6. The method of claim 5, wherein the restricting comprises at least one of reducing the clock rate and switching at least one core to a deactivation mode.

7. The method of claim 1, wherein the ambient weather includes at least one of temperature, humidity, and pressure.

8. A method for controlling current consumption of a mobile device, the method comprising:
identifying ambient weather of the mobile device in response to receiving a request for at least one of booting of the mobile device and initiating a camera of the mobile device; and
limiting a current consumed by the mobile device by restricting a specific module of the mobile device while booting of the mobile device or initiating the camera of the mobile device, based on the identified ambient weather,
wherein the limiting of the current consumed by the mobile device is stopped when the booting or the initiating is completed.

9. The method of claim 8, wherein the initiating of the camera of the mobile device includes movement of a lens barrel.

10. The method of claim 8, wherein limiting the current consumed by the mobile device comprises reducing current consumed by at least one module of the mobile device having a high instantaneous current consumption.

11. The method of claim 10, wherein limiting the current consumed by the at least one module of the mobile device having the high instantaneous current consumption comprises restricting one of a clock rate and a number of operating cores.

12. The method of claim 11, wherein restricting one of the clock rate and the number of operating cores comprises reducing the clock rate and switching at least one core to a deactivation mode, respectively.

13. The method of claim 8, wherein the ambient weather includes one of temperature, humidity, and pressure.

14. The method of claim 8, further comprising determining whether the measurement is lower than a threshold.

15. An apparatus for controlling current consumption of a mobile device, the apparatus comprising:
a sensor configured to identify ambient weather of the mobile device in response to receiving a request for at least one of booting of the mobile device and initiating a camera of the mobile device; and
a controller configured to limit a current consumed by the mobile device by restricting operation of at least one element of the mobile device while booting of the mobile device or initiating the camera of the mobile device, based on the identified ambient weather,
wherein the controller stops the limiting of the current consumed by the mobile device when the booting or the initiating is completed.

16. The apparatus of claim 15, wherein the controller is configured to restrict operation of at least one module of the mobile device having a high instantaneous current consumption.

17. The apparatus of claim 16, wherein the controller is configured to restrict at least one of a clock rate and a number of operating cores of at least one processor of the mobile device.

18. The apparatus of claim 17, wherein the restricting comprises at least one of reducing the clock rate and switching at least one core to a deactivation mode.

* * * * *